US007614528B2

(12) United States Patent
Jeong

(10) Patent No.: US 7,614,528 B2
(45) Date of Patent: Nov. 10, 2009

(54) LIQUID DISPENSING APPARATUS CAPABLE OF REGULATING DISCHARGED AMOUNT OF LIQUID

(75) Inventor: Jin-Do Jeong, Daejeon-si (KR)

(73) Assignee: Barflex Corporation, Daejeon (KR)

( * ) Notice: Subject to any disclaimer, the term of this patent is extended or adjusted under 35 U.S.C. 154(b) by 529 days.

(21) Appl. No.: 10/597,603

(22) PCT Filed: Nov. 30, 2005

(86) PCT No.: PCT/KR2005/004052

§ 371 (c)(1),
(2), (4) Date: Aug. 1, 2006

(87) PCT Pub. No.: WO2007/029901

PCT Pub. Date: Mar. 15, 2007

(65) Prior Publication Data

US 2008/0251544 A1 Oct. 16, 2008

(30) Foreign Application Priority Data

Sep. 5, 2005 (KR) ...................... 10-2005-0082101
Sep. 5, 2005 (KR) ...................... 20-2005-0025542

(51) Int. Cl.
*G01F 11/28* (2006.01)
*B65D 47/00* (2006.01)

(52) U.S. Cl. ....................... 222/438; 222/442; 222/448; 222/449; 222/451; 222/453

(58) Field of Classification Search ................. 222/453, 222/449, 476, 448, 505, 442, 451, 477, 445, 222/446, 450, 434, 438, 439, 440
See application file for complete search history.

(56) References Cited

U.S. PATENT DOCUMENTS 2,464,030 A * 3/1949 Engstrom .................. 222/309

(Continued)

FOREIGN PATENT DOCUMENTS

KR 10-2005-0063438 A 6/2005

*Primary Examiner*—Kevin P Shaver
*Assistant Examiner*—Donnell Long
(74) *Attorney, Agent, or Firm*—Sughrue Mion, PLLC

(57) ABSTRACT

Disclosed is a liquid dispensing apparatus capable of regulating a discharged amount of liquid. The apparatus comprises a main body having a liquid storing part formed therein and a protrusion part communicated with the liquid storing part at a side of the main body, downwardly protruded and having a threaded part formed therein, a support member having a liquid supply aperture formed thereto being provided to an inside of the protrusion part; a liquid discharge-operating member supported to be vertically movable on the support member provided to the protrusion part of the main body and controlling a liquid inflow into the protrusion member; a cover fixed on an upper part of the main body to which the liquid discharge-operating member is supported and having a hole through which a part of the liquid discharge-operating member is protruded and an opening into which a liquid supply receptacle is inserted and fixed; a liquid discharging member thread-engaged to be relatively movable to the threaded part of the protrusion part, capable of changing an inner space formed with the protrusion part and vertically moved as the liquid discharge-operating member is vertically moved, thereby discharging the liquid to an exterior; and a lever rotatably mounted to the main body and pressing the liquid discharge-operating member protruded through the hole of the cover to move the liquid discharge-operating member.

9 Claims, 7 Drawing Sheets

U.S. PATENT DOCUMENTS

| | | | | | |
|---|---|---|---|---|---|
| 2,506,125 | A | * | 5/1950 | White | 222/442 |
| 2,808,178 | A | * | 10/1957 | Mcintyre et al. | 222/38 |
| 2,820,579 | A | * | 1/1958 | Roth | 222/440 |
| 4,238,056 | A | * | 12/1980 | Tucker et al. | 222/181.2 |
| 4,905,875 | A | | 3/1990 | Straiton | |
| 4,964,544 | A | * | 10/1990 | Hanna et al. | 222/181.2 |
| 5,676,278 | A | | 10/1997 | Beyer et al. | |
| 5,713,492 | A | * | 2/1998 | DeGennaro | 222/153.03 |
| 5,857,596 | A | * | 1/1999 | Lee | 222/509 |
| 5,862,952 | A | * | 1/1999 | Lee | 222/146.6 |
| 6,269,984 | B1 | * | 8/2001 | Murakami | 222/472 |
| 6,305,581 | B1 | * | 10/2001 | Bonningue et al. | 222/321.3 |
| 6,375,043 | B1 | | 4/2002 | Leblanc | |
| 6,530,501 | B2 | * | 3/2003 | Till | 222/148 |
| 7,066,355 | B2 | * | 6/2006 | Lewis et al. | 222/145.5 |
| 2002/0139816 | A1 | * | 10/2002 | Powling | 222/341 |
| 2006/0071033 | A1 | * | 4/2006 | Lewis | 222/321.9 |

* cited by examiner

[Fig. 1]
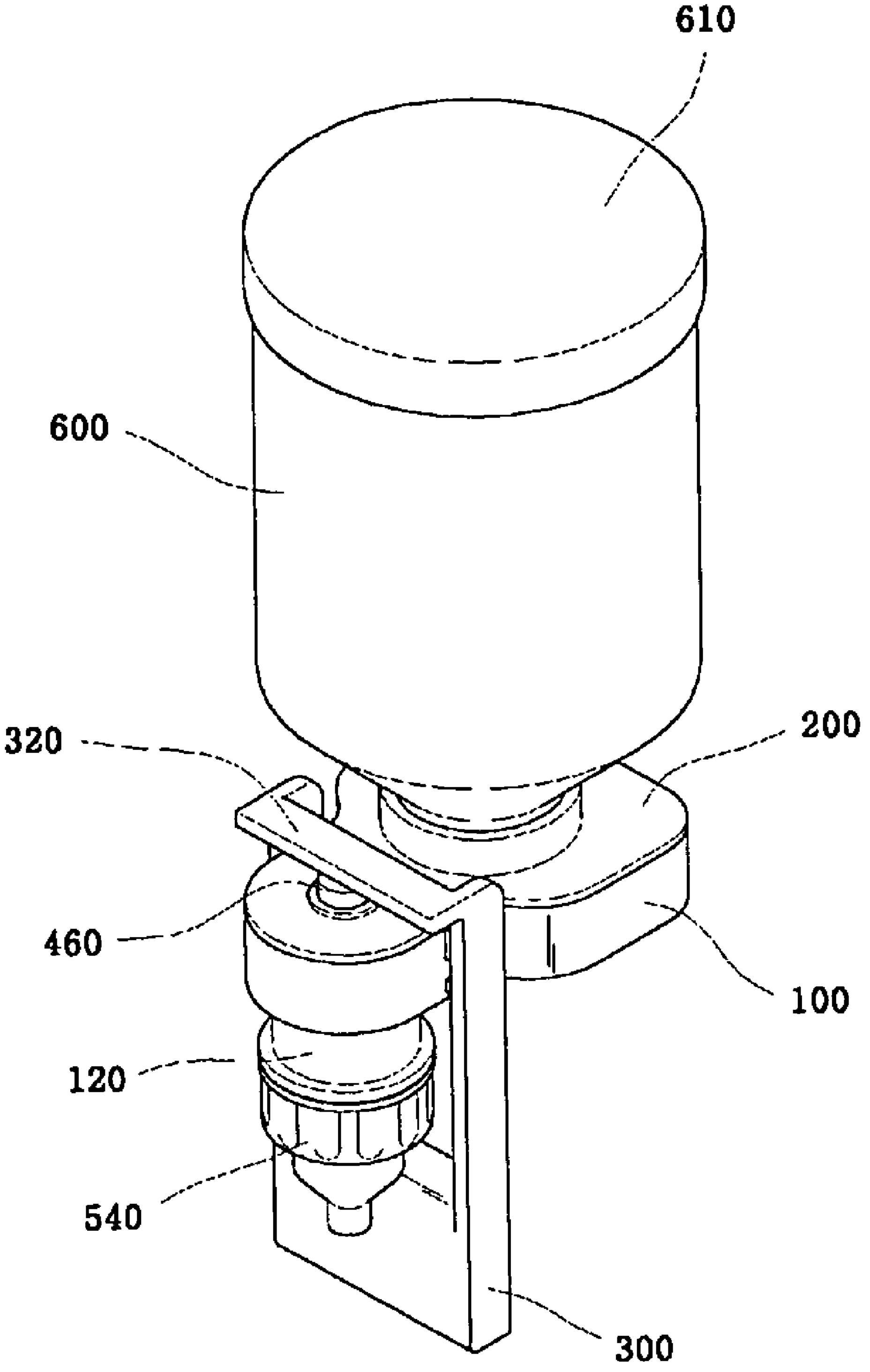

[Fig. 2]
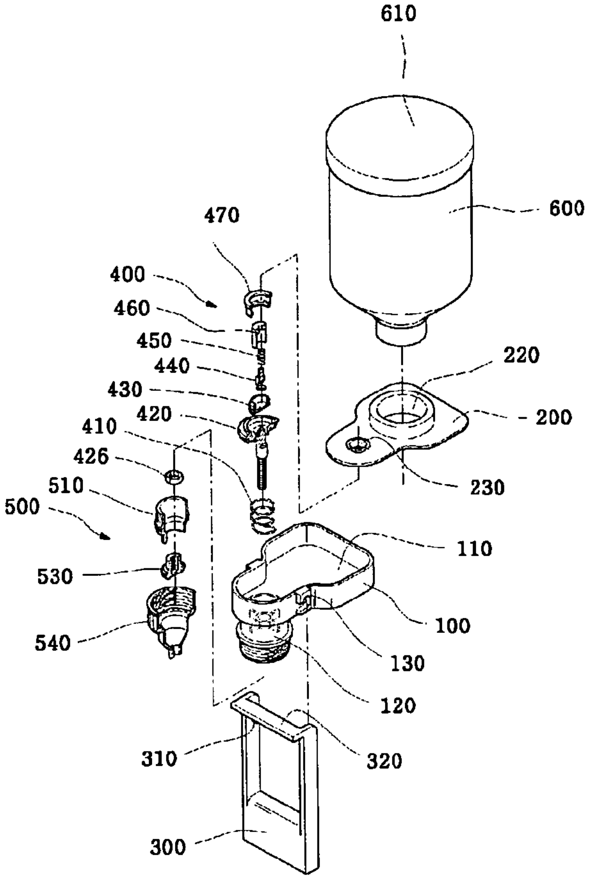
[Fig. 3]
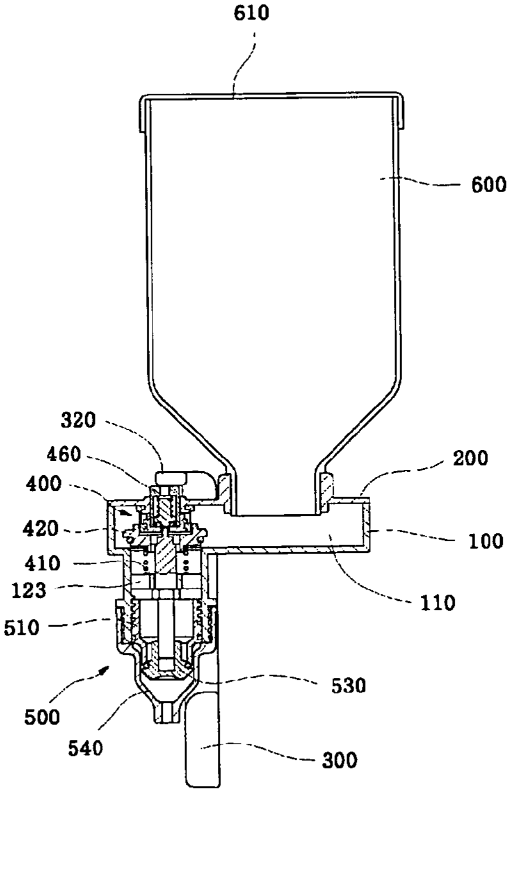

[Fig. 4]
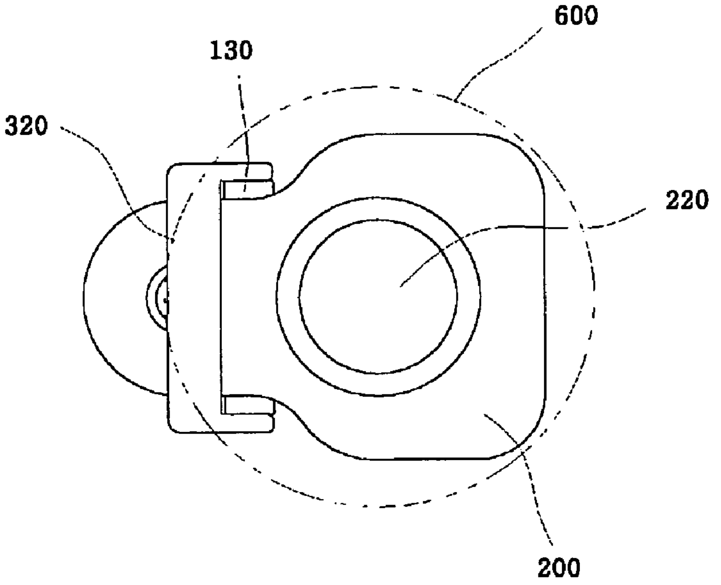
[Fig. 5]
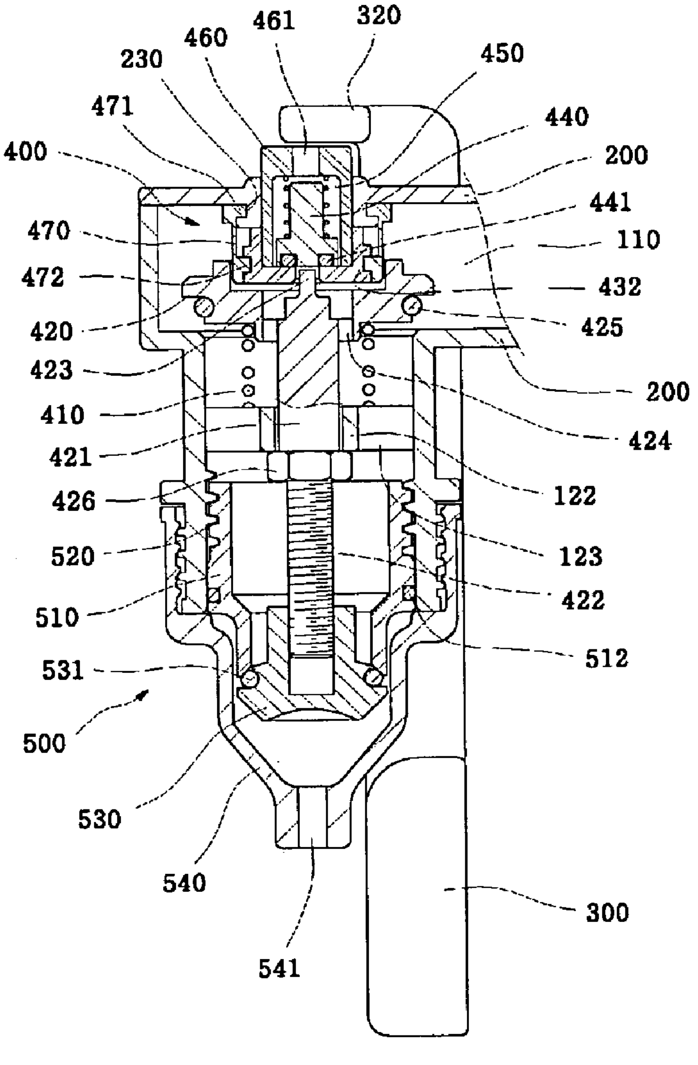

[Fig. 6]
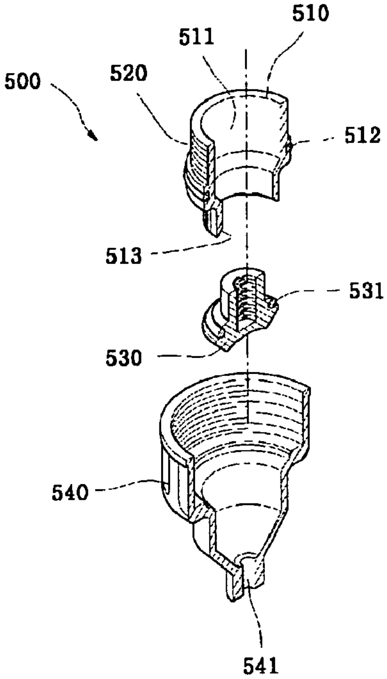
[Fig. 7]
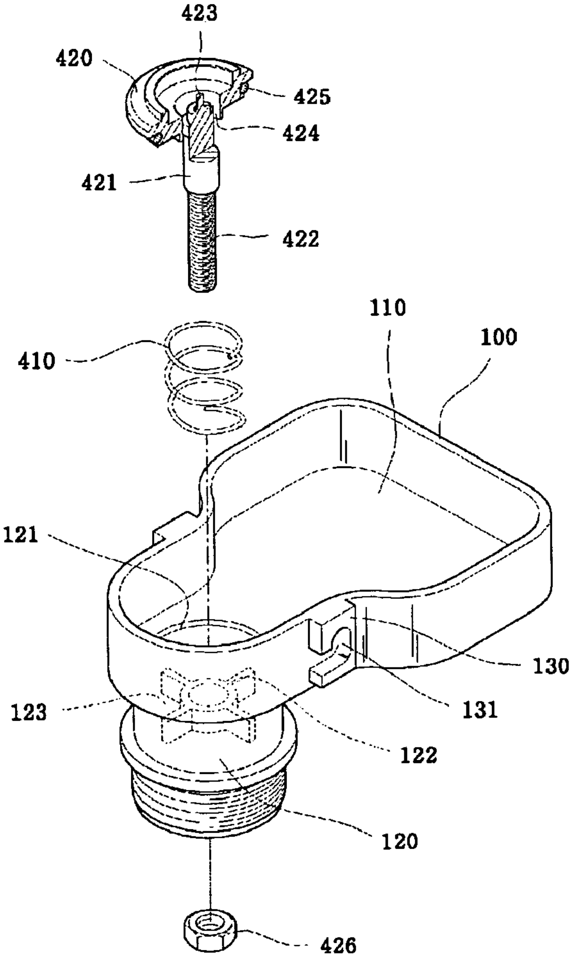

[Fig. 8]
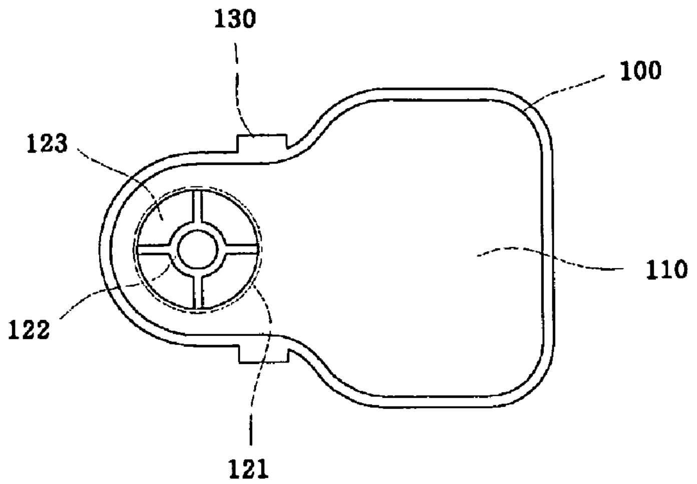
[Fig. 9]
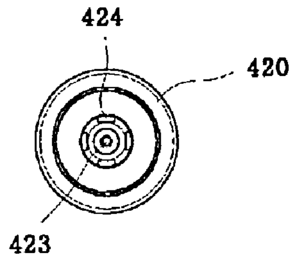
[Fig. 10]
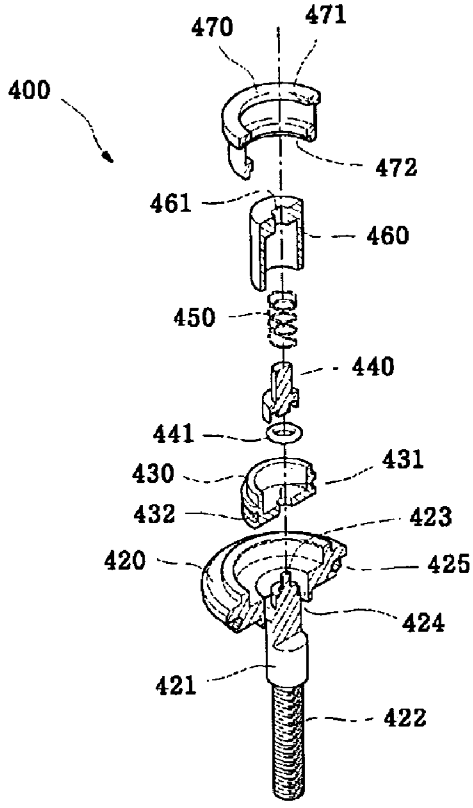

[Fig. 11]
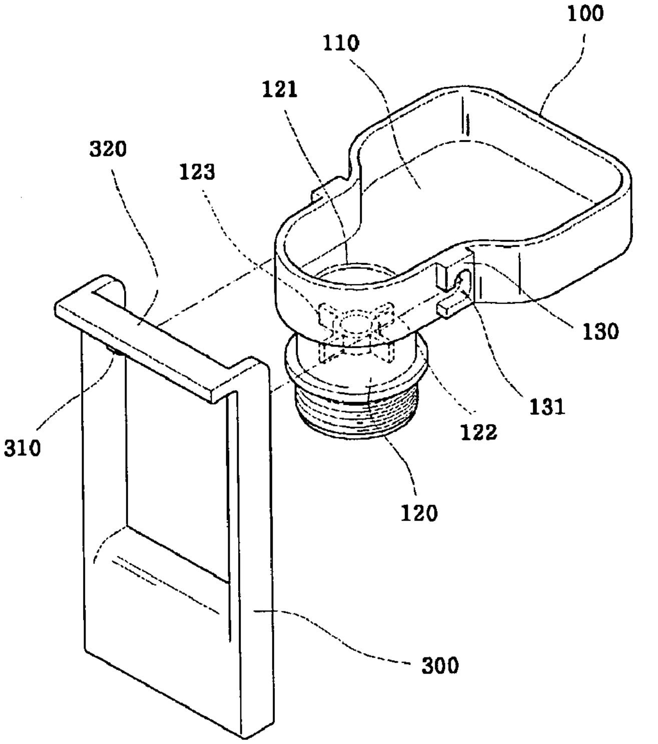
[Fig. 12]
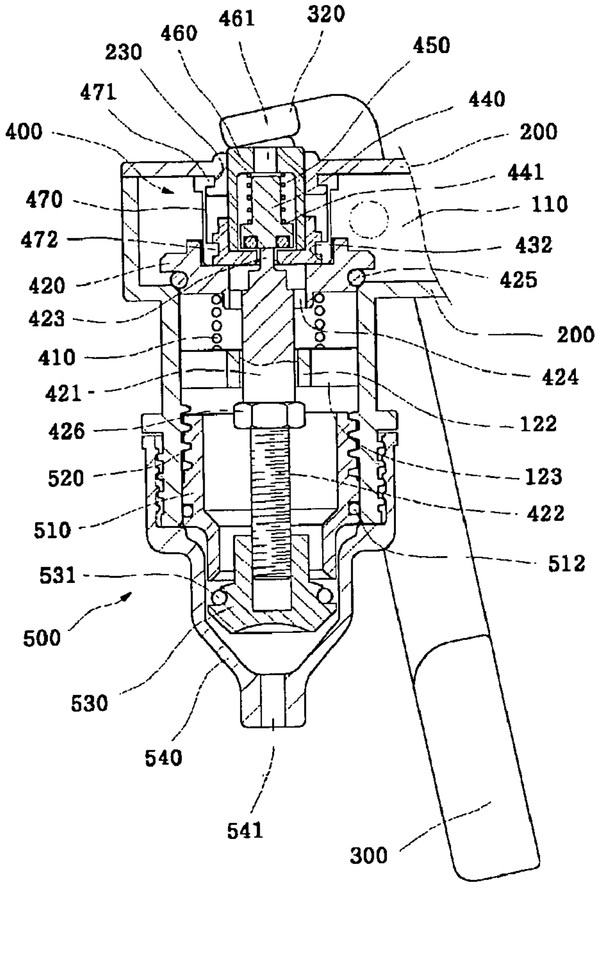

[Fig. 13]
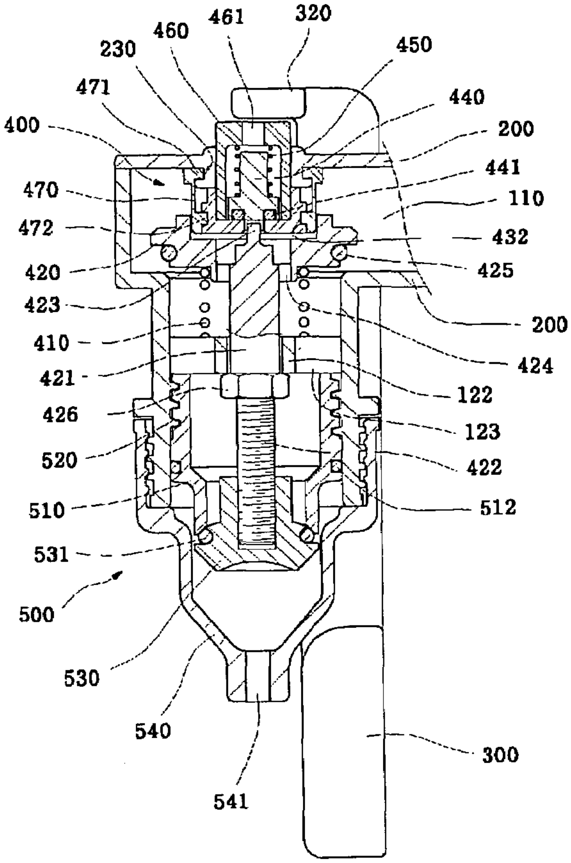
[Fig. 14]
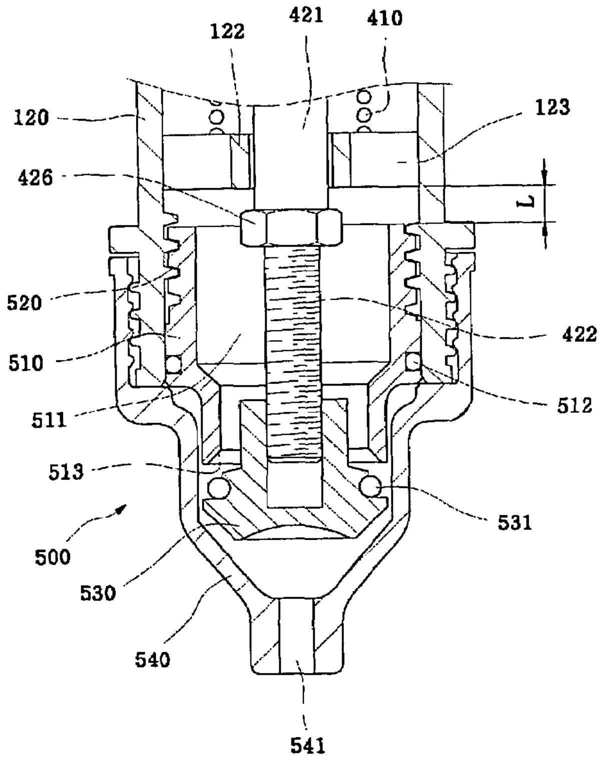

LIQUID DISPENSING APPARATUS CAPABLE OF REGULATING DISCHARGED AMOUNT OF LIQUID

This is a national stage application under 35 U.S.C. § 371 of PCT/KR2005/004052 filed on Nov. 30, 2005, which claims priority from Korean patent application 10-2005-0082101 filed on Sep. 5, 2005, and Korean patent application 20-2005-0025542 filed on Sep. 5, 2005, all of which are incorporated herein by reference.

TECHNICAL FIELD

The invention relates to a liquid dispensing apparatus discharging a constant amount of liquid all the time, which is downwardly discharged as a lever is operated, and more particularly to a liquid dispensing apparatus capable of regulating a discharged amount of liquid.

BACKGROUND ART

A purifier having a receptacle containing drinking water mounted thereto and discharging the water is widely popularized and used in offices, banks, public offices and the like. Since the purifier is such structured that the liquid is discharged as a lever is operated, when a user looks up at another place while operating the lever or does not stop the operation of the lever, the liquid may overflow a cup containing the liquid. Accordingly, when it is desired to contain a predetermined amount of liquid in the cup, the user should measure an amount of the liquid being discharged into the cup while operating the lever. If the liquid exceeds the predetermined amount, the user should waste the exceeded amount of liquid.

In order to solve the problems, it is used a liquid dispensing apparatus automatically interrupting an outlet with a sensor, solenoid valve and the like when a predetermined amount of liquid passes through the outlet and thus preventing the liquid more than the predetermined amount from being discharged through the outlet. However, since the sensor or solenoid valve is operated by an electrical signal, the apparatus can be used only in a place at which an electrical equipment is established, and is expensive. In addition, as electricity is used, an additional cost occurs. Further, since the electricity should be used, there may occur a short or electrical leakage in a damp place.

Regarding the above problems, there has been suggested a liquid dispensing apparatus mechanically operated. However, a structure of the apparatus is complex, so that it is difficult to assemble the apparatus, a manufacturing process thereof is complicated and it costs high. Further, a connection between parts thereof is complicated and weak, so that it is easily damaged.

In the mean time, a Korean Patent Application No. 10-2003-0094843 discloses a liquid dispensing apparatus which discharges a predetermined amount of liquid. However, according to the patent application, the discharged amount of liquid is always constant, so that the use of the apparatus is limited when it is needed to regulate an amount of liquid with regard to using places of the apparatus or users. For example, the liquid dispensing apparatus may be used as a liquid dispensing apparatus for oral cleaning liquid. When a child or adult cleans the oral cavity using the cleaning liquid, one-time recommended amounts of the oral cleaning liquid are different. Accordingly, when the child and the adult want to use a proper amount of the cleaning liquid suitable for oneself with the liquid dispensing apparatus, it should be separately provided liquid dispensing apparatuses assembled to meet each of the recommended amounts.

DISCLOSURE OF INVENTION

Technical Problem

Accordingly, the invention has been made to solve the above problems of the prior art. An object of the invention is to provide a liquid dispensing apparatus capable of being used even at a place having no electric equipments and having a simple structure, thereby reducing manufacturing processes.

Another object of the invention is to provide a liquid dispensing apparatus capable of easily regulating a discharged amount of liquid with regard to using places or users.

Technical Solution

In order to achieve the above objects, there is provided a liquid dispensing apparatus capable of regulating a discharged amount of liquid, the apparatus comprising a main body having a liquid storing part formed therein and a protrusion part communicating with the liquid storing part at a side of the main body, downwardly protruding and having a threaded part formed therein, a support member having a liquid supply aperture formed thereto being provided in the protrusion part; a liquid discharge-operating member supported to be vertically movable on the support member provided to the protrusion part of the main body and controlling a liquid inflow into the protrusion member; a cover fixed on an upper part of the main body to which the liquid discharge-operating member is supported and having a hole through which a part of the liquid discharge-operating member is protruded and an opening into which a liquid supply receptacle is inserted and fixed; a liquid discharging member thread-engaged to be relatively movable to the threaded part of the protrusion part, capable of changing an inner space formed with the protrusion part and vertically moved as the liquid discharge-operating member is vertically moved, thereby discharging the liquid to an exterior; a lever pivotably mounted to the main body and pressing the liquid discharge-operating member protruded through the hole of the cover to be moved.

BRIEF DESCRIPTION OF THE DRAWINGS

The above and other objects, features and advantages of the present invention will be more apparent from the following detailed description taken in conjunction with the accompanying drawings, in which:

FIG. 1 is a perspective view schematically showing a liquid dispensing apparatus capable of regulating a discharged amount of liquid according to a preferred embodiment of the invention;

FIG. 2 is an exploded perspective view schematically showing a liquid dispensing apparatus capable of regulating a discharged amount of liquid according to a preferred embodiment of the invention;

FIG. 3 is a sectional view schematically showing a liquid dispensing apparatus capable of regulating a discharged amount of liquid according to a preferred embodiment of the invention;

FIG. 4 is a plan view schematically showing a liquid dispensing apparatus capable of regulating a discharged amount of liquid according to a preferred embodiment of the invention;

FIG. 5 is an enlarged sectional view schematically showing a connected state of a main body and a lower cover according to an embodiment of the invention;

FIG. 6 is an exploded perspective view schematically showing a liquid discharging member according to a preferred embodiment of the invention;

FIG. 7 is an exploded perspective view schematically showing an upper opening/closing member combined in a main body according to an embodiment of the invention, the member having a second elastic member and an operating shaft protruded downwardly;

FIG. 8 is a plan view schematically showing a main body according to a preferred embodiment of the invention;

FIG. 9 is a plan view schematically showing an upper opening/closing member according to a preferred embodiment of the invention;

FIG. 10 is an exploded perspective view schematically showing a liquid discharge-operating member according to a preferred embodiment of the invention;

FIG. 11 is an exploded perspective view schematically showing a connected state of a main body and a lever according to an embodiment of the invention;

FIG. 12 is a sectional view schematically showing that a liquid discharging member and a liquid discharge-operating member are operated by a lever, according to an embodiment of the invention;

FIG. 13 is a sectional view schematically showing a state that a liquid inflow member is upwardly moved to minimize an inflow amount of liquid, according to an embodiment of the invention; and FIG. 14 is a sectional view schematically showing a difference of minimal and maximum levels of an inflow amount of liquid in a liquid inflow member according to an embodiment of the invention.

BEST MODE FOR CARRYING OUT THE INVENTION

Hereinafter, preferred embodiments of the present invention will be described with reference to the accompanying drawings. In the following descriptions of the present invention, a detailed description of known functions and configurations incorporated herein will be omitted when it may make the subject matter of the present invention rather unclear.

FIG. 1 shows a liquid dispensing apparatus capable of regulating a discharged amount of liquid according to an embodiment of the invention. As known well in the art, the apparatus may be mounted to a mounting structure (not shown) which is equipped to a wall and the like. As shown in FIG. 1, the liquid dispensing apparatus comprises a main body 100, a liquid containing receptacle 600 supplying liquid, preferably oral cleaning liquid to the main body 100, a liquid discharge-operating member 400 allowing a predetermined amount of liquid to be discharged and a liquid discharging member 500 discharging the liquid introduced into the main body 100 to an exterior.

The main body 100 keeping the liquid therein comprises a liquid storing part 110 formed therein and a protrusion part 120 communicating with the liquid storing part 110 and protruded downwardly at a side thereof, as shown in FIGS. 2 to 8.

As shown in FIGS. 7 and 8, the protrusion part 120 is fluidly communicated with the liquid storing part 110 of the main body 100, so that the liquid introduced into the liquid storing part 110 can flow into the protrusion part 120. A first inclined surface 121 is formed at a connection region of the protrusion part 120 and the liquid storing part 110 and a support member 122 having a plurality of liquid supply apertures 123 is provided in a middle region of the protrusion part 120.

A lever fastening member 130 having a hinge insert recess 131 is formed at both sides of the main body 100 adjacent to the protrusion part 120.

The liquid discharge-operating member 400 allowing a predetermined amount of liquid introduced into the main body 100 to be discharged is provided above the support member 122.

As shown in FIGS. 2 and 10, a first elastic member 410 is arranged on the support member 122 provided in the middle region of the protrusion part 120 and an upper opening/closing member 420 is on the first elastic member 410, so that the upper opening/closing member 420 is always applied with an elastic force by the first elastic member 410.

The upper opening/closing member 420 includes an operating shaft 421 protruded downwardly at a center thereof, as shown in FIG. 10. The operating shaft 421 is formed such that a part thereof passes through the support member 122 provided to the inside of the protrusion member 120 of the main body 100 and protrudes below the support member 122. The operating shaft 421 protruded below the support member 122 is formed with a threaded part 422 and fastened with a fastening member, for example nut 426. Accordingly, it is possible to prevent the upper opening/closing member 420 from being separated upwardly due to the elastic force of the first elastic member 410.

The upper opening/closing member 420 has a diameter approximately corresponding to an inner diameter of the protrusion part 120 of the main body 100 and is provided with a first sealing member 425 at a lower periphery which is air-tightly contacted to the first inclined surface 121 at which the liquid storing part 110 and the protrusion part 120 of the main body 100 are connected. Accordingly, when the upper opening/closing member 420 is descended and thus the first sealing member 425 is air-tightly contacted to the first inclined surface 121, the liquid introduced in the liquid storing part 110 of the main body 100 cannot flow in the protrusion part 120.

As shown in FIG. 9, the upper opening/closing member 420 is formed with a plurality of air passage 424 at the circumference of the operating shaft 421. Accordingly, when the upper opening/closing member 420 closes the protrusion part 120, air can be introduced in the protrusion part 120 through the air passage 424. In the mean time, a push-pin 423 is protrudingly formed on a top of the operating shaft 421.

In the mean time, a pushing member 430 is put on the upper opening/closing member 420, which is opened upwardly and formed with an air supply aperture 431 at a lower center thereof into which the push-pin 423 is inserted. In addition, a periphery of the pushing member 430 is formed with a fixing recess 432.

As shown in FIGS. 5 and 10, an air sealing member 440 having a second sealing member 441 fastened thereto is fixed to a lower inside of the pushing member 430, thereby sealing the air supply aperture 431 of the pushing member 430. A pressing member 460 having a bottom opened and an inner diameter larger than a diameter of the air sealing member 440 is inserted into the pushing member 430.

The pressing member 460 is formed with an air inflow opening 461 at a top part thereof. As shown in FIGS. 5 and 10, a second elastic member 450 is inserted between the air sealing member 440 and the pressing member 460, so that the air sealing member 440 is elastically compressed to the pushing member 430 due to the second elastic member 450.

In the mean time, a cover 200 is fixed to an upper part of the main body 100, which has a hole 210 through which the pressing member 460 of the liquid discharge-operating member 400 is protruded and a receptacle inserting opening 220.

As shown in FIG. 5, a fixing step 230 protruding outwardly from the through-hole 210 is formed in the cover 200. A variable member 470 is fixed to the fixing step 230 of the cover 200 and the fixing recess 432 of the pushing member 430.

The variable member 470 is made of a soft material such as silicon and comprises an upper engaging protrusion 471 protruding inwardly and fixed to the fixing step 230 of the cover 200 and a lower fixing protrusion 472 protruding inwardly and inserted into the fixing recess 432 of the pushing member 430, so that it connects the inside of the cover 200 and the pushing member 430.

The liquid discharging member 500 is provided below the support member 122 in the protruding part 120 of the main body 100, and comprises a liquid inflow member 510 forming a hollow space 511 therein, as shown in FIGS. 5 and 6, provided with a second inclined surface 513 at a lower end thereof and fixed below the support member 122.

Threaded parts 520 are formed on an outer part of the liquid inflow member 510 and an inner part of the protrusion part 120, so that the liquid inflow member 510 is engaged with the protrusion part 120 to be vertically movable while being rotated below the support member 122 of the protrusion part 120.

A third sealing member 512 is provided to a lower periphery of the liquid inflow member 510, so that the liquid inflow member is air-tightly contacted to the protrusion part 120. Accordingly, it is possible to prevent the liquid from flowing between the liquid inflow member 510 and the protrusion part 120.

A lower opening/closing member 530 connected to the treaded part 422 of the operating shaft 421 is provided below the liquid inflow member 510.

The lower opening/closing member 530 can be vertically moved together with the upper opening/closing member 420 and is provided with a fourth sealing member 531 at a lower periphery thereof, which is air-tightly contacted to the second inclined surface 513 formed on the lower end of the liquid inflow member 510. Accordingly, when the lower opening/closing member 530 is air-tightly contacted to the lower end of the liquid inflow member 510, the fourth sealing member 531 of the lower opening/closing member 530 is air-tightly contacted to the second inclined surface 513 formed on the lower end of the liquid inflow member 510, so that the liquid contained in the liquid inflow member 510 cannot be discharged to the exterior.

A lower cover 540 is engaged to an outside of the lower part of protrusion part 120 into which the liquid inflow member 510 and the lower opening/closing member 530 are inserted. In order to easily engage the lower cover 540 and the protrusion part 120, a threaded part is respectively formed on the outside of the protrusion part 120 and the inside of the lower cover 540. An outlet 541 is formed to a lower center of the lower cover 540, through which the liquid contained in the liquid inflow member 510 is discharged to the exterior when the lower opening/closing member 530 is disconnected from the liquid inflow member 510.

In the mean time, a hinge 310 of a lever 300 is inserted and fixed in the hinge insert recess 131 of the lever fastening member 130, as shown in FIG. 11. The lever 300 is formed with a press rod 320 at the top thereof, which presses the pressing member 460 protruded through the through-hole 210 of the cover 200. Accordingly, as known in the art, when a user pushes the lever 300, the press rod 320 presses the pressing member 460 of the liquid discharge-operating member 400.

When it is desired to use the invention having the structure as described above, the liquid containing receptacle 600 is first put in the receptacle inserting opening 220 of the cover 200 fixed to the upper part of the main body 100.

Since the liquid containing receptacle 600 is filled with liquid such as oral cleaning liquid, the liquid kept in the receptacle 600 flows in the liquid storing part 110 of the main body 100.

The liquid containing receptacle 600 supplying the liquid to the liquid storing part 110 of the main body 100 is preferred to have a separate cover 610 so that a user can refill the liquid without replacing the receptacle 600, as shown in FIGS. 1 to 3. However, it may be possible to form a cutting member in the receptacle inserting recess 220 so as to cut an inlet of the receptacle 600. In this case, the empty receptacle is replaced with a new one, instead of refill the liquid in the receptacle.

In the mean time, as shown in FIG. 5, since the upper opening/closing member 420 is upwardly raised by the first elastic member 410, thus the first sealing member 425 of the upper opening/closing member 420 is disconnected from the first inclined surface 121 of the main body 100 and the fourth sealing member 531 of the lower opening/closing member 530 connected to the threaded part 422 of the operating shaft 421 of the upper opening/closing member 420 is air-tightly contacted to the second inclined surface 513 of the liquid inflow member 510, the liquid introduced in the liquid storing part 110 passes through the liquid supply apertures 123 via between the first sealing member 425 of the upper opening/closing member 420 and the first inclined surface 121 of the main body 100 and then is introduced and kept in the inner space 511 of the liquid inflow member 510.

At this time, since the nut 426 is fastened to the threaded part 422 of the operating shaft 421 passing through the support member 122 although the upper opening/closing member 420 is upwardly pressed due to the first elastic member 410, the upper opening/closing member 420 is not separated upwardly.

When the liquid is filled in the protrusion part 120 and the space 511 of the liquid inflow member 510 of the liquid discharging member 500, the air is not introduced in the main body because the second sealing member 441 provided to the air sealing member 440 of the liquid discharge-operating member 400 seals the air supply aperture 431 by the elasticity of the second elastic member 450.

Under such circumferences, when a user pushes the lever 300 using a cup (not shown) as shown in FIG. 12, the lever 300 is pivoted around the hinge 310 inserted in the hinge insert recess 131 of the lever fastening member 130 and the press rod 320 of the lever 300 downwardly presses the pressing member 460 of the liquid discharge-operating member 400 protruded through the through-hole 210 of the cover 200.

When the press rod 320 of the lever 300 presses the pressing member 460 protruded through the hole 210 of the cover 200, the pressing member 460 pushes the pushing member 430 as shown in FIG. 13, so that the pushing member 430 is descended.

In the mean time, the engaging protrusions 471, 472 of the variable member 470 are respectively engaged to the fixing recess 432 of the pushing member 430 and the fixing step 230 of the cover 200. Accordingly, when the pushing member 430 and the air sealing member 440 are descended by the pressing member 460, since the variable member 470 is made of soft silicon, the upper engaging protrusion 471 fixed to the fixing step 230 of the cover 200 is fixed but the lower engaging protrusion 472 fixed to the fixing recess 432 of the pushing member 430 is descended together with the pushing member 430, so that the variable member 470 is extended to seal the circumferences of the pushing member 430 and the pressing member 460. In addition, as the air sealing member 440 is descended, the push-pin 423 of the operating shaft 421 of the upper opening/closing member 420 inserted in the air supply aperture 431 of the pushing member 430 is pressed, so that the upper opening/closing member 420 is descended together with the pressing member 460.

As the upper opening/closing member 420 is descended due to the rotation of the lever 300, the first elastic member 410 is compressed and the first sealing member 425 of the upper opening/closing member 420 is air-tightly contacted to the first inclined surface 121 formed on the connected region of the main body 100 and the protrusion part 120, so that the liquid introduced in the liquid storing part 110 of the main body 100 dose not flow in the protrusion part 120 any more.

When the push-pin 423 of the upper opening/closing member 420 is continuously pressed under state that the first sealing member 425 provided to the upper opening/closing member 420 of the liquid discharge-operating member 400 is air-tightly contacted to the first inclined surface 121 of the main body 100 as described above, since the upper opening/closing member 420 is not descended any more, the air sealing member 440 is ascended while compressing the second elastic member 450 by the push-pin 423.

When the air sealing member 440 is ascended by the push-pin 423 of the upper opening/closing member 420 which cannot be descended any more, the air supply aperture 431 of the pushing member 430 sealed by the second sealing member 441 of the air sealing member 440 is opened, so that the exterior air is supplied to the air supply aperture 431 of the pushing member 430 through the air inflow opening 461 of the pressing member 460, as shown in FIG. 12. The air supplied to the air supply aperture 431 of the pushing member 430 of the liquid discharge-operating member 400 is introduced into the protrusion part 120 of the main body 100 through the air passages 424 formed at the periphery of the upper opening/closing member 420 adjacent to the operating shaft 421.

When the upper opening/closing member 420 is descended by the lever 300 and thus seals the inside of the protrusion part 120 of the main body 100, since the lower opening/closing member 530 of the liquid discharging member 500 provided below the support member 122 of the protrusion part 120 is connected to the threaded part 422 of the operating shaft 421 of the upper opening/closing member 420, the lower opening/closing member 530 is moved together with the upper opening/closing member 420.

When the lower opening/closing member 530 of the liquid discharging member 500 is descended together with the upper opening/closing member 420, the fourth sealing member 531 air-tightly contacted to the second inclined surface 513 of the liquid inflow member 510 is also descended. Accordingly, the liquid kept in the inside of the protrusion part 120 of the main body 100 and the space 511 of the liquid inflow member 510 sealed by the descending upper opening/closing member 420 flows between the liquid inflow member 510 and the lower opening/closing member 530 and is discharged to the exterior via the outlet 541 of the lower cover 540 fastened to the protrusion part 120, thereby filling the cup.

When the liquid kept in the inside of the protrusion part 120 and the space 511 of the liquid inflow member 510 sealed by the upper opening/closing member 420 flows downwardly and then is discharged, the air is continuously supplied to the inside of the protrusion part 120 through the liquid discharge-operating member 400, so that the liquid is more easily discharged to the exterior.

When all the liquid kept in the space 511 is discharged under state that an additional inflow of the liquid is interrupted as the first sealing member 425 of the upper opening/closing member 420 is air-tightly contacted to the first inclined surface 121, the user takes out the cup. Thereby, the force applied to the lever 300 is removed, so that the upper opening/closing member 420 is ascended due to the elasticity of the first elastic member 410. When the upper opening/closing member 420 is ascended, the lower opening/closing member 530 connected to the threaded part 422 of the operating shaft 421 of the upper opening/closing member 420 is also ascended.

As the upper opening/closing member 420 and the lower opening/closing member 530 are ascended by the elasticity of the first elastic member 410, the inside of the protrusion part 120, which is sealed by the air-tight contact of the first sealing member 425 of the upper opening/closing member 420 and the first inclined surface 121 of the main body 100, is opened and the fourth sealing member 531 formed at the lower opening/closing member 530 of the liquid discharging member 500 is air-tightly contacted to the second inclined surface 513 of the liquid inflow member 510 to seal the lower part of the liquid inflow member 510 at the same time.

As the force applied to the lever 300 is removed, the force applied to the pressing member 460 is also removed, so that the upper opening/closing member 420 is raised by the elasticity of the first elastic member 410. At this time, the pushing member 430 and the pressing member 460 are ascended. As the pushing member 430 is ascended, the push-pin 423 of the upper opening/closing member 420 is disconnected from the air sealing member 440 and the air sealing member 440 is moved to the pushing member 430 due to the elasticity of the second elastic member 450.

When the air sealing member 440 is moved to the pushing member 430 due to the elasticity of the second elastic member 450, the second sealing member 441 of the air sealing member 440 seals the air supply aperture 431 of the pushing member 441 to prevent the air from being introduced in the main body 100.

When the upper and lower opening/closing members 420, 530 are ascended by the first elastic member 410 as described above, the liquid passes to the gap formed between the upper opening/closing member 420 and the protrusion part 120 of the main body 100 and then is introduced and kept in the protrusion part 120 and the space 511 of the liquid inflow member 510 of the liquid discharging member 550. Accordingly, it is possible to discharge a predetermined amount of liquid to the exterior all the time.

When it is desired to regulate the amount of liquid to be discharged to the exterior, the lower cover 540 fastened to the lower part of the protrusion part 120 is first removed.

After that, the liquid inflow member 510 of the liquid discharging member 500 connected to the threaded part 520 of the protrusion part 120 is rotated. At this time, if the liquid inflow member is rotated to maintain an interval between the top part of the liquid inflow member 510 and the support member 122 provided to the middle region of the protrusion part 120 as shown in FIG. 5, the overall internal volume of the protrusion part 120 is increased, so that it is possible to increase the amount of liquid to be discharged. Alternatively, as shown in FIG. 13, if the liquid inflow member 510 is rotated so that the top part thereof is closely contacted to the lower surface of the support member 122 provided in the middle region of the protrusion part 120, the internal volume of the protrusion part 120 is decreased. Accordingly, it is possible to reduce the amount of liquid to be discharged.

In other words, if the liquid inflow member 510 of the liquid discharging member 500 is moved, the internal volume of the protrusion part 120 is regulated. At this time, as shown in FIG. 14, since the liquid inflow member 510 is moved by a distance (L), it is possible to regulate a discharged amount of liquid by regulating the moving distance (L).

While the invention has been shown and described with reference to certain preferred embodiments thereof, it will be understood by those skilled in the art that various changes in form and details may be made thereto without departing from the spirit and scope of the invention as defined by the appended claims. For example, the structure allowing the air to be introduced in the protrusion part can be omitted as necessary and this is also within the scope of the invention.

INDUSTRIAL APPLICABILITY

As described above, according to the invention, it is possible to discharge a constant amount of liquid all the time through the operating shaft and opening/closing members descended by the lever.

In addition, according to the invention, the apparatus can be used irrespective of the places and has a simple structure, so that it is possible to easily assemble the apparatus and to reduce the manufacturing processes.

Further, according to the invention, since it is possible to regulate the space into which the liquid is introduced while moving the liquid inflow member in the protrusion part of the main body, a user can easily regulate an amount of liquid to be discharged.

The invention claimed is:

1. A liquid dispensing apparatus capable of regulating a discharged amount of liquid, the apparatus comprising:

a main body having a liquid storing part formed therein and a protrusion part communicating with the liquid storing part at a side of the main body, downwardly protruding and having a threaded part formed therein, a support member having a liquid supply aperture formed thereto being provided in the protrusion part;

a liquid discharge-operating member supported to be vertically movable on the support member provided to the protrusion part of the main body and controlling a liquid inflow into the protrusion part;

a cover fixed on an upper part of the main body to which the liquid discharge-operating member is supported and having a hole through which a part of the liquid discharge-operating member is protruded and an opening into which a liquid supply receptacle is inserted and fixed;

a liquid discharging member thread-engaged to be relatively movable to the threaded part of the protrusion part, capable of changing an inner space formed with the protrusion part and vertically moved as the liquid discharge-operating member is vertically moved, thereby discharging the liquid to an exterior; and a lever pivotally mounted to the main body and pressing the liquid discharge-operating member protruded through the hole of the cover to be moved;

wherein the liquid discharging member comprises a first elastic member compressively supported on the support member;

an upper opening/closing member forced upwardly by the first elastic member, having an operating shaft formed at a lower surface thereof, downwardly protruding through the support member in the protrusion part and fixed at a lower surface of the support member by a fastening member, and capable of being air-tightly engaged to the protrusion part at a connected region with the liquid storing part; and a pressing member mounted on the upper opening/closing member, having a second elastic member mounted therein, protruding through the hole of the cover and downwardly pressed by the lever to move the upper opening/closing member;

wherein the upper opening/closing member comprises a push-pin protrudingly formed on a top of the operating shaft thereof and a plurality of air passages at circumferences of the shaft, and wherein the pressing member is formed with an air passage at a center of a top part thereof; and wherein the liquid discharge-operating member comprises, a pushing member arranged on the upper opening/closing member, opened upwardly and formed with an air supply aperture at a lower center thereof into which the push-pin of the upper opening/closing member is inserted and a fixing recess at a periphery of the pushing member;

an air sealing member mounted around the air supply aperture of the pushing member, inserted into the pressing member and sealing the air supply aperture by an elastic force applied from the second elastic member in the pressing member; and a variable member having a first fixing protrusion inserted and fixed in the fixing recess of the pushing member and a second fixing protrusion inserted and fixed in a fixing step protruding outwardly from the hole of the cover, the variable member being fixed while surrounding the pushing member and the pressing member.

2. The apparatus according to claim 1, wherein the variable member is made of a material capable of being easily deformed by an external force, and wherein a length between the first fixing protrusion fixed to the cover and the second fixing protrusion inserted in the pushing member is extended when the pushing member is downwardly moved as the pressing member is operated downwardly by the lever.

3. The apparatus according to claim 2, wherein the liquid discharging member comprises, a liquid inflow member having a space formed therein, thread-engaged with the threaded part of the protrusion part and capable of being vertically relatively-movable to the protrusion part, thereby regulating a volume of the protrusion part; and a lower opening/closing member connected to the liquid discharge-operating member so that it is operated by the liquid discharge-operating member and capable of being air-tightly engaged to a lower part of the liquid inflow member.

4. The apparatus according to claim 1, wherein the liquid discharging member comprises, a liquid inflow member having a space formed therein, thread-engaged with the threaded part of the protrusion part and capable of being vertically relatively-movable to the protrusion part, thereby regulating a volume of the protrusion part; and a lower opening/closing member connected to the liquid discharge-operating member so that it is operated by the liquid discharge-operating member and capable of being air-tightly engaged to a lower part of the liquid inflow member.

5. The apparatus according to claim 1, wherein the liquid discharging member comprises, a liquid inflow member having a space formed therein, thread-engaged with the threaded part of the protrusion part and capable of being vertically relatively-movable to the protrusion part, thereby regulating a volume of the protrusion part; and a lower opening/closing member connected to the liquid discharge-operating member so that it is operated by the liquid discharge-operating member and capable of being air-tightly engaged to a lower part of the liquid inflow member.

6. The apparatus according to claim 1, wherein the liquid discharging member comprises, a liquid inflow member having a space formed therein, thread-engaged with the threaded part of the protrusion part and capable of being vertically relatively-movable to the protrusion part, thereby regulating a volume of the protrusion part; and a lower opening/closing member connected to the liquid discharge-operating member so that it is operated by the liquid discharge-operating member and capable of being air-tightly engaged to a lower part of the liquid inflow member.

7. The apparatus according to claim 6, wherein the lower opening/closing member is thread-connected with the operating shaft of the upper opening/closing member and moved together with the upper opening/closing member.

8. The apparatus according to claim 7, further comprising a lower cover connected to a lower outside of the protrusion part and having an outlet discharging the liquid flowing out between the liquid inflow member and the lower opening/closing member to an exterior.

9. The apparatus according to claim 1, wherein the liquid is oral cleaning liquid.

* * * * *